United States Patent [19]

Leroy et al.

[11] Patent Number: 4,748,810
[45] Date of Patent: Jun. 7, 1988

[54] HYDROMECHANICAL TORQUE TRANSMISSION DEVICE

[75] Inventors: Daniel Leroy, Yvelines; Jean-Francois Boellman, Beauchamp, both of France

[73] Assignee: Compagnie de Construction Mecanique Sulzer, Mantes la Jolie, France

[21] Appl. No.: 901,526

[22] Filed: Aug. 28, 1986

[30] Foreign Application Priority Data

Sep. 2, 1985 [FR] France .................. 85 13005

[51] Int. Cl.$^4$ ............................................. F15B 15/18
[52] U.S. Cl. ....................................... 60/488; 60/487
[58] Field of Search ............... 60/444, 487, 488, 490

[56] References Cited

U.S. PATENT DOCUMENTS

| | | | |
|---|---|---|---|
| 3,404,584 | 10/1968 | Trautmann | 60/487 X |
| 3,766,804 | 10/1973 | Mori . | |
| 4,109,466 | 8/1978 | Keech . | |
| 4,492,541 | 1/1985 | Mallen-Herrero et al. | 418/23 |
| 4,503,928 | 3/1985 | Mallen-Herrero et al. | 418/26 X |

FOREIGN PATENT DOCUMENTS

| | | |
|---|---|---|
| 915271 | 10/1946 | France . |
| 1239820 | 7/1960 | France . |
| 1231667 | 9/1960 | France . |

*Primary Examiner*—Gerald A. Michalsky
*Attorney, Agent, or Firm*—Browdy and Neimark

[57] ABSTRACT

A hydromechanical torque transmission device comprises three coaxial rotatable bodies. These are a driving body, an intermediary body and a driven body. The driving and driven bodies are adapted to be coupled to respective coaxial shafts that are to be coupled together in rotation. A speed correlator system is adapted to maintain the speeds of the driving and driven bodies relative to the intermediary body in a predetermined ratio. The intermediary body comprises a hydraulic circuit. The driving and intermediary bodies define a first pump adapted to cause a flow of fluid in this hydraulic circuit. The intermediary and driven bodies define a second pump also adapted to cause a flow of fluid in the hydraulic circuit. One at least of the first and second pumps has a variable volumetric capacity. The device also comprises means for controlling variations in this variable volumetric capacity.

8 Claims, 6 Drawing Sheets

HYDROMECHANICAL TORQUE TRANSMISSION DEVICE

BACKGROUND OF THE INVENTION

1. Field of the Invention

The present invention concerns a hydromechanical power transmission device adapted to drive a driven shaft from a driving shaft at any rotation speed equal to, less than or greater than that of the driving shaft. Thus it may be thought of as a hydromechanical variable speed drive.

2. Description of the Prior Art

There are already known torque converters adapted to drive a driven shaft at the speed of a driving shaft, starting, for example, from a null speed (increasing speed function) using turbine blades attached to each of the two shafts and immersed in a transmission fluid. The efficiency of a hydraulic transmission device of this kind is very low because of losses associated with friction and with the viscosity of the transmission fluid employed. It is for this reason that, after the two shafts are synchronized, they are mechanically coupled in rotation with no further action by the hydraulic transmission: this necessitates a specific control device.

Apart from their low efficiency, currently known hydraulic torque transmission devices are relatively inflexible in use, there being in practice virtually no more than the basic provision for bringing a driven shaft up to the speed of a driving shaft.

An object of the invention is to alleviate these disadvantages by proposing a high-efficiency hydraulic device.

Another object of the invention is a torque transmission device adapted to drive a driven shaft over a wide range of speeds encompassing the possible speeds of the driving shaft and procuring great flexibility of utilization even in the case of driven shaft speeds of limited variation.

SUMMARY OF THE INVENTION

The invention consists in a hydromechanical torque transmission device comprising three coaxial rotatable bodies, namely a driving body, an intermediary body and a driven body, said driving and driven bodies being adapted to be coupled to respective coaxial shafts to be coupled together in rotation, and a speed correlator system adapted to maintain the speeds of said driving and driven bodies relative to said intermediary body in a predetermined ratio, in which device said intermediary body comprises a hydraulic circuit, said driving and intermediary bodies comprise complementary first pump means defining a first pump adapted to cause a flow of fluid in said hydraulic circuit, said intermediary and driven bodies comprise complementary second pump means defining a second pump adapted to cause a flow of fluid in said hydraulic circuit, and at least one of said first and second pumps is of variable volumetric capacity, the device further comprising means for controlling variations in said variable volumetric capacity.

Thus a device of this kind comprises an intermediary rotating body which is not directly coupled either to the driven shaft or to the driving shaft and within which there occurs a flow of fluid at a flowrate dependent on the relative speeds of the central and external bodies relative to it, which are furthermore maintained in a constant ratio, and on the instantaneous ratio of the volumetric capacities of the pumps that the central and external bodies each define with the intermediary body. This device combines at all times hydraulic and mechanical type torque transmission in proportions which vary according to said relative speeds. Its efficiency is high because, for example, when the driving and driven shafts are synchronized there is no further hydraulic flow or viscous friction. The device is also of considerable flexibility since, according to the ratio selected between the volumetric capacities of the pumps, which may be less than, equal to or greater than the ratio of the relative speeds, the speed of the driven shaft may be varied either side of that of the driving shaft.

According to a preferred feature of the invention the system for correlating the speeds of the driven and driving bodies relative to the intermediary body is a plane epicyclic gear, preferably of type II, which makes it possible to use ratios differing greatly from unity.

In accordance with another preferred feature of the invention, each pump comprises blades which slide, preferably axially, in housings in one of the bodies against a continuous wall of the other body featuring periodic fluctuations defining recesses. These continuous walls in each pump are preferably formed on the intermediary body while the associated vanes are accommodated in the driven and driving bodies.

The variable volumetric capacity pump is preferably of the type described in U.S. Pat. No. 4,503,928 of Mar. 12, 1985, while the fixed volumetric capacity pump is advantageously of the type described in U.S. Pat. No. 4,492,541 of Jan. 8, 1985. Both pumps may be of variable volumetric capacity in order to increase the permissible range of ratios between their volumetric capacities, of course.

The system controlling the volumetric capacity of the variable volumetric capacity pump or pumps is preferably an ancillary hydraulic circuit independent of the main hydraulic circuit in which the transmission fluid flows. It may equally well be a circuit grafted onto the main hydraulic circuit.

The objects, characteristics and advantages of the invention will emerge from the following description given by way of non-limiting example only and with reference to the appended drawings.

DESCRIPTION OF THE PREFERRED EMBODIMENT

Figure 1:
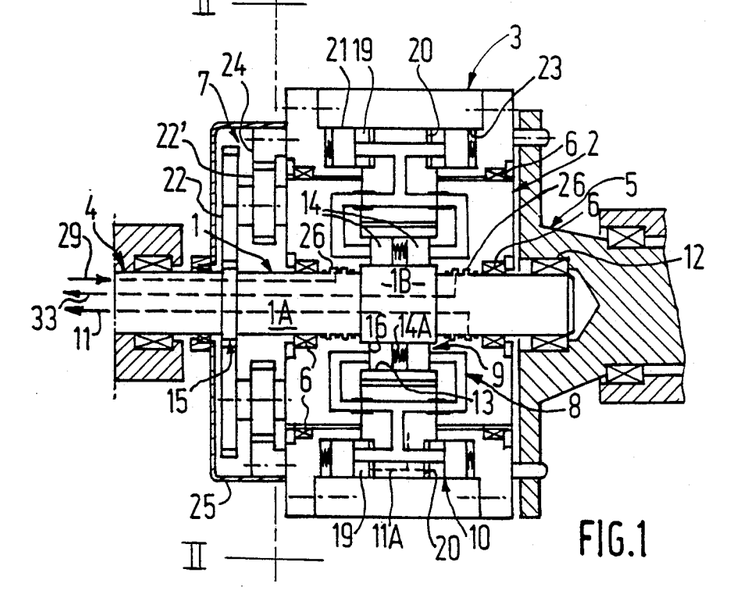
FIG. 1 is a schematic view in axial cross-section of a hydromechanical transmission device in accordance with the invention.
Figure 2:
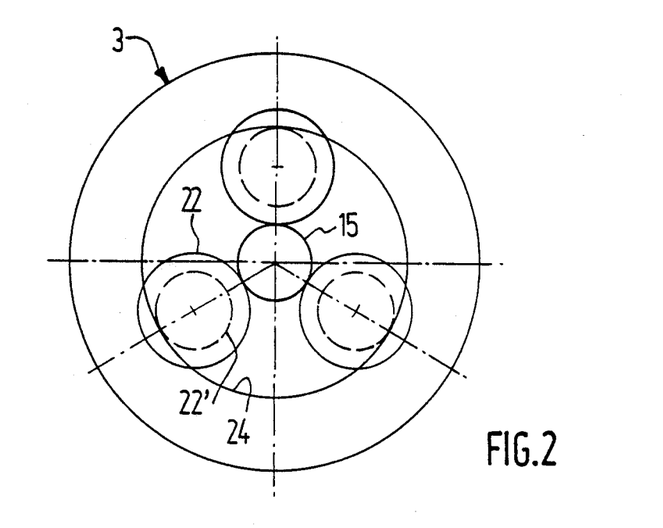
FIG. 2 is a view of it in transverse cross-section on the line II—II in FIG. 1, showing the speed correlator system.

As shown schematically in FIGS. 1 and 2, a hydromechanical torque transmission device in accordance with the invention, which might also be referred to as a hydrostatic variable speed drive, comprises a group of three concentric rotating bodies 1, 2 and 3 of which a central body 1 is adapted to be coupled to a first shaft 4, in this case a driving shaft, an external second body 3 is adapted to be coupled to a second shaft 5, in this case a driven shaft, and a third, intermediary body 2 is disposed radially between the other two with the aid of annular bearings 6. To these bodies are fixed component parts of a speed correlator system 7 adapted to maintain the speeds $\omega 3$ and $\omega 1$ of the bodies 3 and 1 relative to the intermediary body 2 in a predefined positive constant ratio K, given by the WILLIS equation, apart from the sign, as follows:

$$K = \frac{\omega 3 - \omega 2}{\omega 2 - \omega 1}$$

Figure 5:
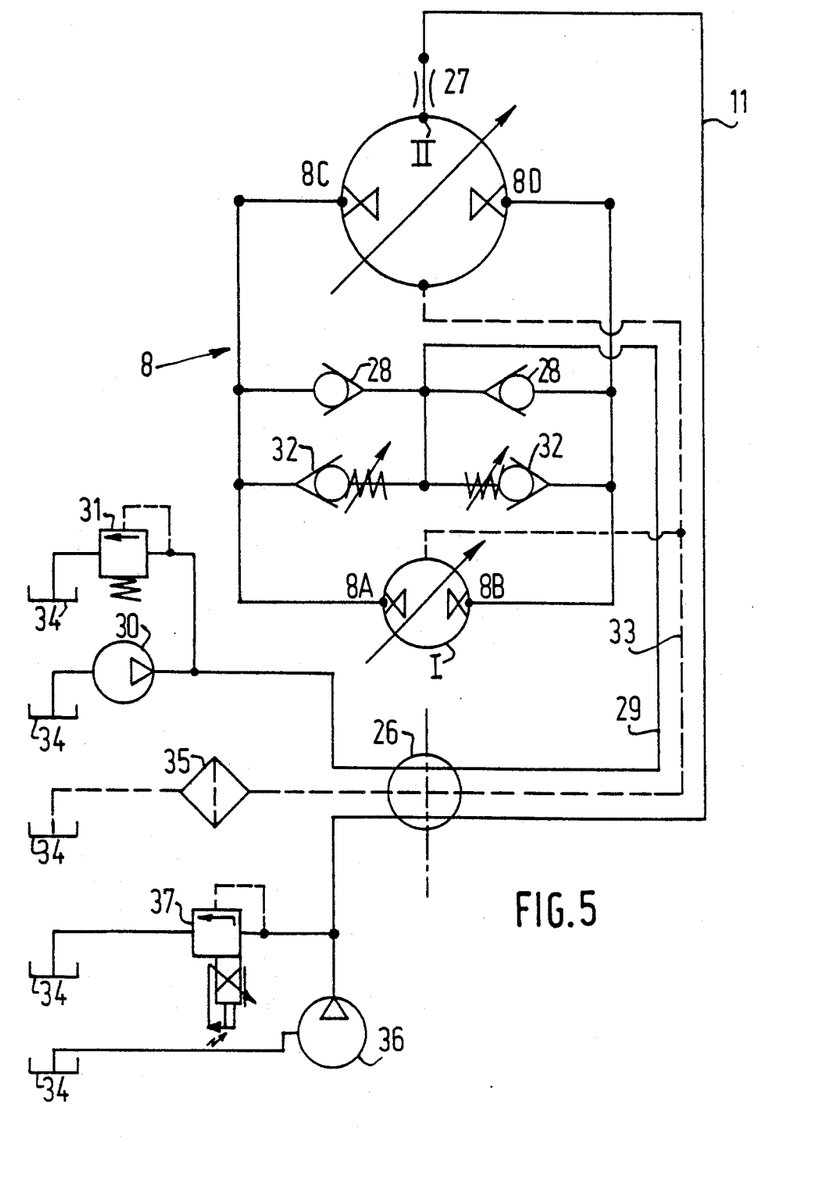
FIG. 5 is a schematic of the hydraulic circuit of the device of FIG. 1.

In the intermediary body 2 there is a hydraulic circuit 8 in which fluid may be caused to flow by a primary pump 9, defined conjointly by complementary first pump members carried by the bodies 1 and 2, and by a secondary pump 10, defined conjointly by complementary second pump members carried by the bodies 2 and 3, at least one of these pumps, in this instance the secondary pump 10, having a variable volumetric capacity adapted to be controled by a control system 11, in this case hydraulic, shown only in FIG. 5 for reasons of clarity in the drawings.

The secondary pump is adapted to adopt a reference volumetric capacity $C°_{II}$ for which the ratio of the volumetric capacities $C_I$ and $C_{II}$ of the primary and secondary pumps is in a ratio k equal to K.

$$k = C_I/C°_{II} = K$$

The central body 1 comprises a central shaft 1A adapted to be coupled to the shaft 4 and which is centered within the shaft 5 by a bearing 12. This central shaft is fastened, substantially at the middle, into a cylindrical block 1B in which are formed housings 13 for pairs of vanes 14 which are axially slidable and referred to hereinafter as primary pump vanes. Between the vanes of a given pair there are disposed separator springs 14A. A gearwheel or planet wheel 15 is also attached to the central shaft 1A.

Figure 3:
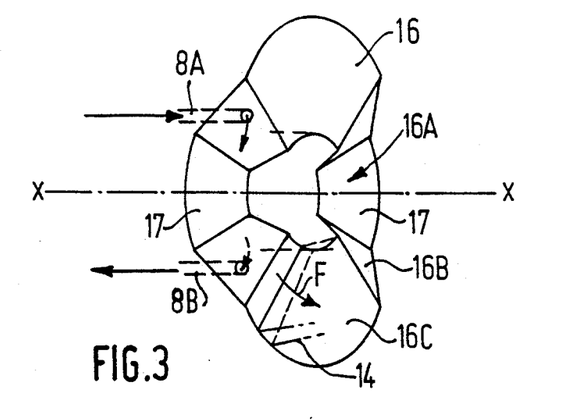
FIG. 3 is a partial detailed view of it in perspective showing a continuous back wall against which vanes of a primary pump bear.

The intermediary body comprises, on either axial side of the primary pump vanes 14, substantially transverse continual walls 16 referred to hereinafter as primary pump walls, the geometry of which is shown in FIG. 3. A back wall of this kind features cyclical fluctuations with recesses 17, of which there are two in this instance, regularly distributed in the circumferential direction, delimited by rectilinear backs 16A and inclined areas or ramps 16B transitional with rectilinear intermediate portions 16C. Into each recess, to be more precise into their inclined ramps 16B, discharge two channels 8A and 8B forming part of the hydraulic circuit 8. On relative rotation between the bodies 1 and 2 the vanes 14 slide with their edge against a back wall of this kind. Sliding of the vanes in the direction of the arrow F in principle procures aspiration of fluid via the channel 8A and discharge via the channel 8B.

The primary pump 9 is thus advantageously of the type indicated by the aforementioned U.S. Pat. No. 4,492,541. The recesses in the continuous back walls 16 are preferably equal in number and disposed axially in line with one another.

Figure 4:
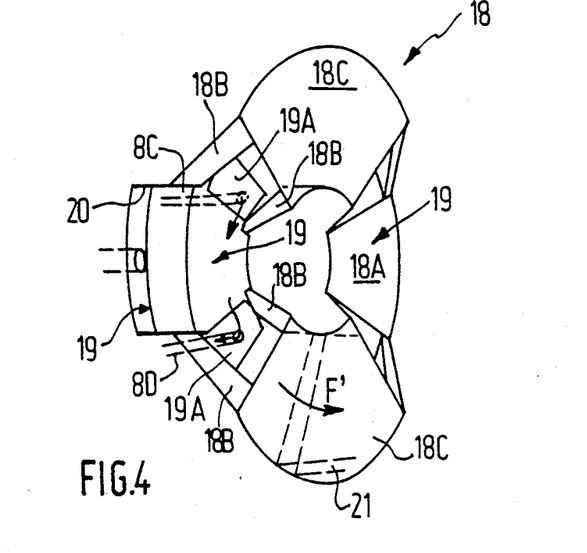
FIG. 4 is an analogous view showing a composite continuous back surface against which vanes of a secondary pump bear.

The intermediary body 2 further features in its radially outermost portion an annular part 2B delimited axially by two substantially transverse walls 18 referred to hereinafter as secondary pump walls, the geometry of which is shown in FIG. 4. As for the walls 16, these walls 18 have cyclical fluctuations, two in number in this instance, regularly distributed in the circumferential direction and delimited by rectilinear backs 18A and inclined areas or ramps 18B, here duplicated, transitional with rectilinear intermediate portions 18C. The backs 18A are formed on members 19 movable axially in housings 20 in the annular portion 2B. These members 19, which are advantageously joined together to form an annular ring, comprise on either circumferential side of the backs 18A lugs 19A which facilitate guiding them in the housings 20. These lugs 19A are inserted between ramps 18B disposed radially inside and radially outside them, being less inclined than the latter relative to the general rotation axis X—X; these lugs and these ramps ensure a continuous although composite transitional part between the parts 18A and 18C for the vanes 21 to bear on.

As with the back walls 16, channels 8C and 8D forming part of the hydraulic circuit 8 discharge on each circumferential side of the back 18A of each recess, here through the lugs 19A. When the vanes 21 slide on a back wall 18 in the direction of the arrow F' in FIG. 4, fluid is aspirated through the channel 8C and discharged through the channel 8D.

In the example under consideration a control fluid inlet channel 11A forming part of the control hydraulic system 11 discharges into each housing 20 under the associated member 19.

In a preferred arrangement of the invention the two secondary pump walls 18 that the device of FIG. 1 comprises have the same number of recesses, and these are axially aligned with each other. The maximal value of the volume of the recesses in one of the composite back walls is advantageously equal to the minimal value of the volume of the recesses in the other wall, this common value corresponding to the aforementioned reference volumetric capacity $C°_{II}$.

The intermediary body 2 carries, on its lefthand side in FIG. 1, freely rotatable shafts on each of which are mounted two gearwheels or satellite wheels 22 and 22', the first of which mesh with the gearwheel 15 of the body 1.

The outer body 3 surrounds the annular portion 2B of the intermediary body and comprises, axially opposite the back walls 18, housings 23 in which the aforementioned vanes 21, referred to hereinafter as the secondary pump vanes, slide axially.

The variable volumetric capacity secondary pump is thus advantageously of the type described in the aforementioned U.S. Pat. No. 4,503,928, and is hydraulically controlled.

The outer body comprises, on its lefthand side in FIG. 1, an internally toothed ring or planet wheel 24 with which the gearwheels 22' mesh.

The toothed ring 24, the gearwheels 22 and 22' and the gearwheel 15 define an epicyclic gear, to be more precise a type II epicyclic gear, adapted to constitute the aforementioned speed correlator system 7. This epicyclic gear is protected by a casing 25.

In both pumps 9 and 10 the vanes 14 and 21 project axially relative to a plane transverse wall which lies adjacent rectilinear intermediary portions of the associated back walls.

The hydraulic circuit in FIG. 5 comprises a first portion situated inside the intermediary body 2 and a second part disposed outside the device of FIG. 1, these two parts being linked by rotating seals 26 disposed between the intermediary body 2 and the shaft 1A of the body 1.

Within the device are the primary pump I and secondary pump II of variable throughput connected by the hydraulic circuit 8. The control line 11 also terminates at the secondary pump through a control flowrate limiter 27.

A boost line 29 from a boost pump 30 discharges into the hydraulic circuit 8 through a boost pressure limiter 31 and boost check valves 28. High-pressure safety valves 32 are also provided in order to limit pressurization of the circuit 18 as and when necessary.

Fluid is also discharged by the pumps I and II through a return line 33 (shown in dashed line) to a storage tank 34 through a filter 35.

The control line 11 is fed from the storage tank 34 by a pump 36 with which is associated a parallel variable calibration limiter 37 adapted to vary the control pressure and to absorb the throughput of this pump modulated by the flow in the line 11. By adjusting the calibration of the pressure limiter 37 it is possible to control the pressure applied to the rear of the mobile backs 19. According to the sign of the difference between this pressure and the high pressure in the circuit 8, set by the valves 32, the volumetric capacity is reduced or increased.

In an alternative embodiment that is not shown the pump 36 is eliminated and the line 11 is connected to the main circuit 8.

The operation of the device from FIG. 1 will be described with reference to FIG. 6 in which, for reasons of simplicity, only one recess is shown for each pump, the vanes being shown here as if able to slide radially. Thus this is in the nature of an imaginary cross-section through the device of FIG. 1. The variable volumetric capacity of the secondary pump is indicated by dashed lines which, of course, have no structural significance.

When the input shaft 4 is driven at a constant speed $\omega 1$ (from 500 through 3 000 rpm, for example) and the volumetric capacity of the secondary pump is at its reference value, it is readily verified that fluid merely circulates between the pumps I and II without any transmission of torque. The throughput of the primary pump has the value:

$$C_I(\omega 1 - \omega 2)$$

while the throughput of the secondary pump has the value:

$$C^\circ_{II}(\omega 2 - \omega 3)$$

Given the definitions of $C^\circ_{II}$, k and K, these throughputs are the same.

For this value of volumetric capacity the speed of the driving shaft has no effect on that of the driven shaft. If the latter is null it remains null.

Figure 6:
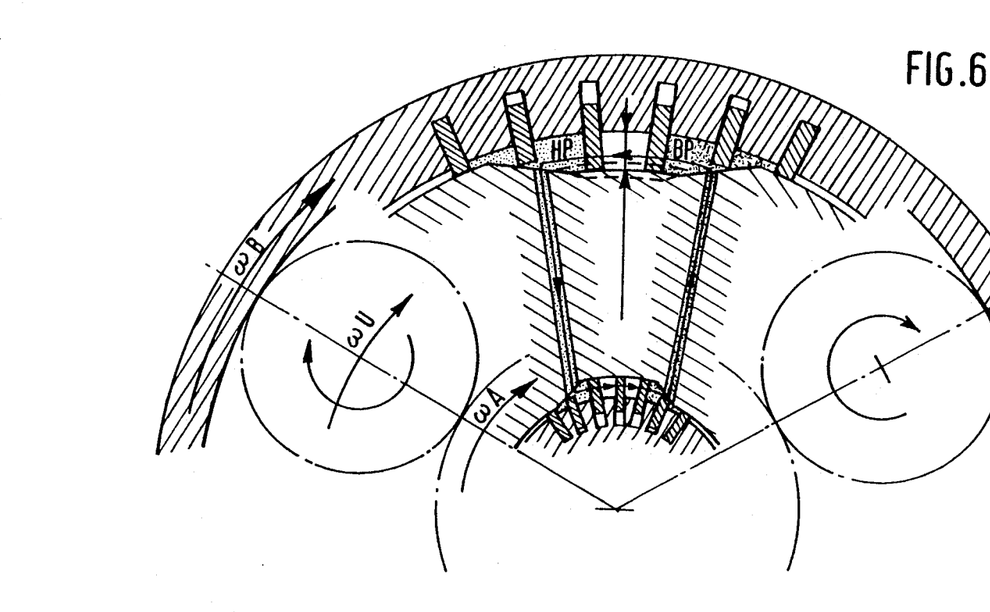
FIG. 6 is a schematic transverse view showing at one and the same time, in chain-dotted line, the component parts of the speed correlator system and, in full line, parts of the primary and secondary pumps linked by a section of hydraulic circuit, the vanes being shown as if they were slidable radially for reasons of clarity and simplicity.
Figure 7:
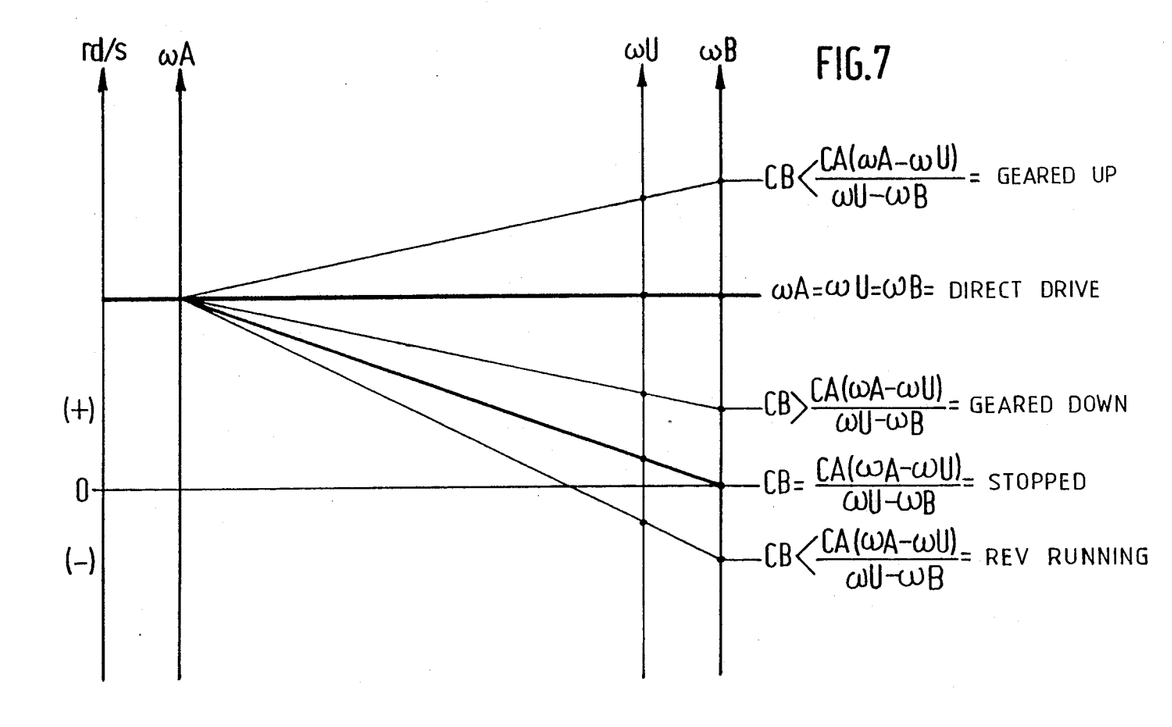
FIG. 7 is a diagram showing the correlation between the absolute rotation speed of the three concentric rotating bodies of the device in FIG. 1.

If by altering the pressure in the control line the volumetric capacity of the secondary pump is increased, this pump discharges more fluid than the primary pump can pass (see the direction of the arrows in FIG. 6). There results an increased pressure in the lefthand passage in FIG. 6 and, by reaction on the vanes of the secondary pump, a driving torque on the outside body 3 in the clockwise direction. The speed $\omega 3$ of the latter therefore tends to approach that $\omega 1$ of the body 1. The diagram of FIG. 7 shows that for a constant value of $\omega 1$ an increase in the value of $\omega 3$ results in an increase in the value of $\omega 2$ because of the epicyclic gear. This phenomenon is reiterated until synchronism is achieved.

The condition of synchronism is stable because if, following a spurious increase in the resistive torque applied to the shaft 5, its speed decreased momentarily, it would spontaneously return to synchronism. On the other hand, if the speed of the shaft 5 increased suddenly, and thus became greater than that of the intermediary body, the direction of fluid flow would be reversed; as the volumetric capacity of the secondary pump would still be greater than its reference value it will be seen that, by virtue of symmetry with what has been described previously, a high pressure would result in the righthand passage of FIG. 6 through which a deceleration torque would be produced by reaction on the vanes 21.

On the other hand, it is possible to go beyond the condition of synchronism if, immediately $\omega 3$ becomes greater than $\omega 1$, the volumetric capacity of the secondary pump is reduced below its reference value by operating on the control circuit; the aforementioned phenomena would be reversed and $\omega 3$ would tend to move away from $\omega 1$, increasing. Likewise, if $\omega 3$ were less than $\omega 1$ it would tend to drop towards zero and to assume a negative value to permit a "reverse running" condition.

The value of $\omega 3$ may be stabilized to any value different from that of $\omega 1$ by periodically switching the control pressure between two values respectively causing the volumetric capacity of the secondary pump to fall below and rise above its reference value.

FIG. 7 shows the correlation graphs corresponding to the five principal torque transmission conditions, for a constant drive speed $\omega 1$ (starting from the bottom): reverse running—stopped—geared down—direct drive—geared up. The device in accordance with the invention makes it easy to change from one condition to another (starting in any direction, acceleration, deceleration, etc.).

Figure 8:
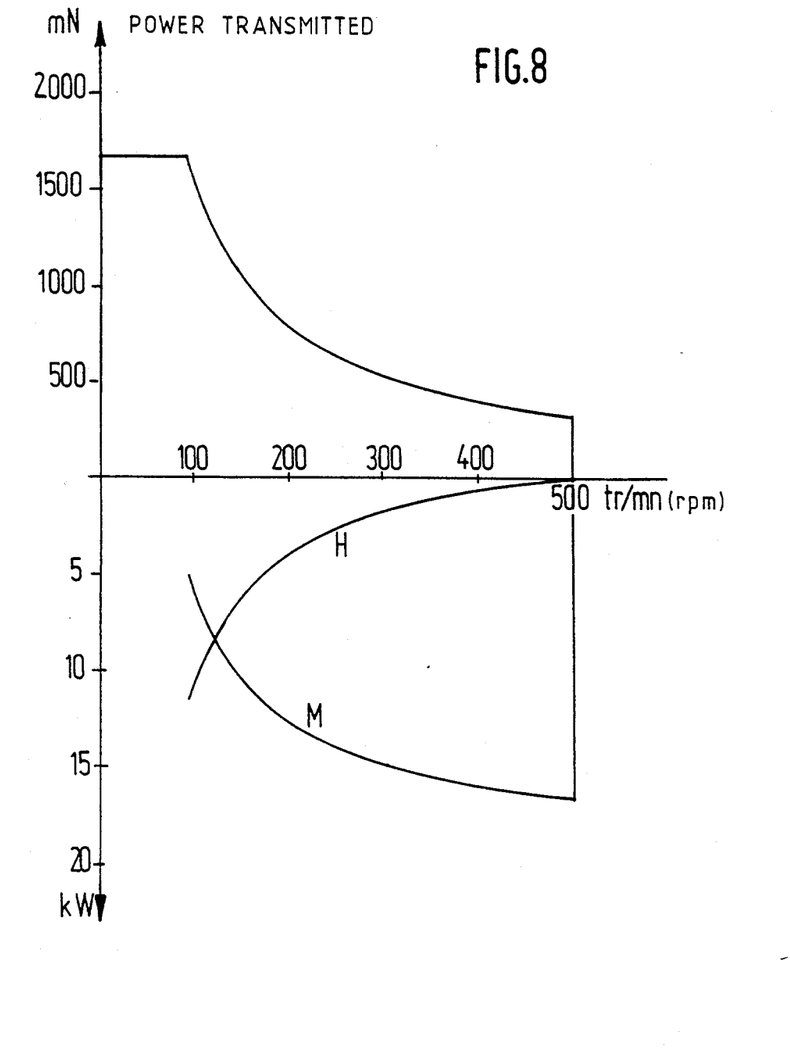
FIG. 8 is a diagram showing the correlation between the torques and the power transmitted as a function of the relative speeds between the central and external bodies.

FIG. 8 shows that the power transmitted (upper part of diagram) features a plateau when the speed of the driven shaft increases and then decreases. The lower part shows that for a transmitted power assumed constant the contribution of the mechanical transmission component increases (line M) while that of the hydraulic transmission component decreases (line H) when the speed of the driven shaft approaches that of the driving shaft. As distinguished from the prior art transmission devices, there is therefore a progressive changeover from a principally hydraulic transmission mode to a principally mechanical transmission mode.

It will also be noted that when synchronism is achieved there is no further flow of fluid in the primary and secondary pumps and the device behaves as a simple transmission shaft: there are no losses by viscous friction or mechanical friction (because of the vanes, teeth, bearings of the epicyclic gear, etc), and this makes it possible to achieve high efficiency.

It will be understood that the foregoing description has been given by way of non-limiting example only and that numerous variants may be proposed by those skilled in the art without departing from the scope of the invention, in particular with regard to the choice of the variable volumetric capacity pump (primary or secondary), the specific structure of the various pumps (in particular, the fixed volumetric capacity pump, if any, may be of the type with radially movable vanes or of any other type), the detailed design of the hydraulic circuits or the type of epicyclic gear chosen (type I, III or IV) or the structure of any alternative speed correlator system.

The roles of the central and outer bodies may be interchanged. More generally, a device in accordance with the invention comprises three coaxial bodies which may have any relative disposition but of which one is a driving body, another is a driven body and the third provides a mechanical intermediary between the other two.

There is claimed:

1. Hydromechanical torque transmission device comprising:
   three coaxial rotatable bodies comprising a driving body, an intermediary body and a driven body, said driving and driven bodies being coupled to respective coaxial shafts adapted to be coupled together in rotation, and
   speed correlator means for maintaining the speeds of said driving and driven bodies relative to said intermediary body in a predetermined ratio,
   said intermediary body comprising a hydraulic circuit,
   said driving and intermediary bodies comprising complementary first pump means defining a first pump adapted to cause a flow of fluid in said hydraulic circuit,
   said intermediary and driven bodies comprising complementary second pump means defining a second pump adapted to cause a flow of fluid in said hydraulic circuit, and
   at least one of said first and second pumps being of variable volumetric capacity,
   the device further comprising means for controlling variations in said variable volumetric capacity.

2. The device according to claim 1, wherein said speed correlator system is an epicyclic gear comprising two planet wheels respectively coupled to said driving and driven bodies and satellite sheels meshing with said planet wheels coupled to said intermediary body.

3. The device according to claim 2, wherein said epicyclic gear is of type II.

4. The device according to claim 1, wherein said first and second pumps comprise vanes and substantially transverse back walls against which said vanes slide axially, said back walls comprising recesses regularly spaced in the circumferential direction.

5. The device according to claim 4, further comprising, in said pump of variable volumetric capacity, members adapted to move axially in response to a control pressure and defining back walls of said recesses.

6. The device according to claim 5, wherein said movable members associated with a back wall are combined to form an axially movable ring member.

7. The device according to claim 1, wherein said first pump defined by said driving and intermediary members is of fixed volumetric capacity and said second pump defined by said intermediary and driven members is of variable volumetric capacity.

8. The device according to claim 1, wherein said driving body is radially inside said intermediary body which is radially inside said driven body.

* * * * *